(12) United States Patent
Hulshof

(10) Patent No.: US 12,313,804 B2
(45) Date of Patent: May 27, 2025

(54) VEHICLE MONITORING SYSTEM AND METHOD OF MONITORING VEHICLES

(71) Applicant: SECUREONE INTERNATIONAL B.V., Eindhoven (NL)

(72) Inventor: Arnoldus Paulus Hulshof, Eindhoven (NL)

(73) Assignee: SECUREONE INTERNATIONAL B.V., Eindhoven (NL)

( * ) Notice: Subject to any disclaimer, the term of this patent is extended or adjusted under 35 U.S.C. 154(b) by 110 days.

(21) Appl. No.: 17/915,750

(22) PCT Filed: Mar. 24, 2021

(86) PCT No.: PCT/NL2021/050194
§ 371 (c)(1),
(2) Date: Sep. 29, 2022

(87) PCT Pub. No.: WO2021/201673
PCT Pub. Date: Oct. 7, 2021

(65) Prior Publication Data
US 2023/0125079 A1    Apr. 27, 2023

(30) Foreign Application Priority Data

Apr. 1, 2020   (NL) .................................. 2025257

(51) Int. Cl.
*G01V 11/00* (2006.01)
*G08B 21/18* (2006.01)
(Continued)

(52) U.S. Cl.
CPC ............ *G01V 11/00* (2013.01); *G08B 21/182* (2013.01); *H04N 5/272* (2013.01); *H04N 7/183* (2013.01)

(58) Field of Classification Search
CPC .......... G01V 11/00; G01V 5/26; G01V 5/281; G01V 5/20; G01V 5/232; G01V 8/10;
(Continued)

(56) References Cited

U.S. PATENT DOCUMENTS 6,249,567 B1 * 6/2001 Rothschild ............. G01N 23/20
378/86
7,148,483 B1 * 12/2006 Testardi .................. G01T 1/201
250/361 R
(Continued)

FOREIGN PATENT DOCUMENTS

| CN | 203535242 U | 4/2014 |
|----|-------------|--------|
| CN | 207318749 U | 5/2018 |

(Continued)

OTHER PUBLICATIONS

International Search Report and Written Opinion dated Jun. 28, 2021, for Application No. PCT/NL2021/050194 (17 pages).
(Continued)

*Primary Examiner* — Daniel R Miller
*Assistant Examiner* — Eric Sebastian Von Wald
(74) *Attorney, Agent, or Firm* — KDW Firm PLLC

(57) ABSTRACT

A vehicle monitoring system configured to detect and localise an anomaly in or on a vehicle. The system includes a detector configured to detect an invisible indicator originating from or emitted by the anomaly and generate a detection signal associated with the invisible indicator, a camera configured to capture an image of the vehicle, and a controller configured to process the detection signal generated by the detector and the image of the vehicle captured by the camera. The controller is further configured to, based on processing of the image and the detection signal, generate a
(Continued)

Figure 1:
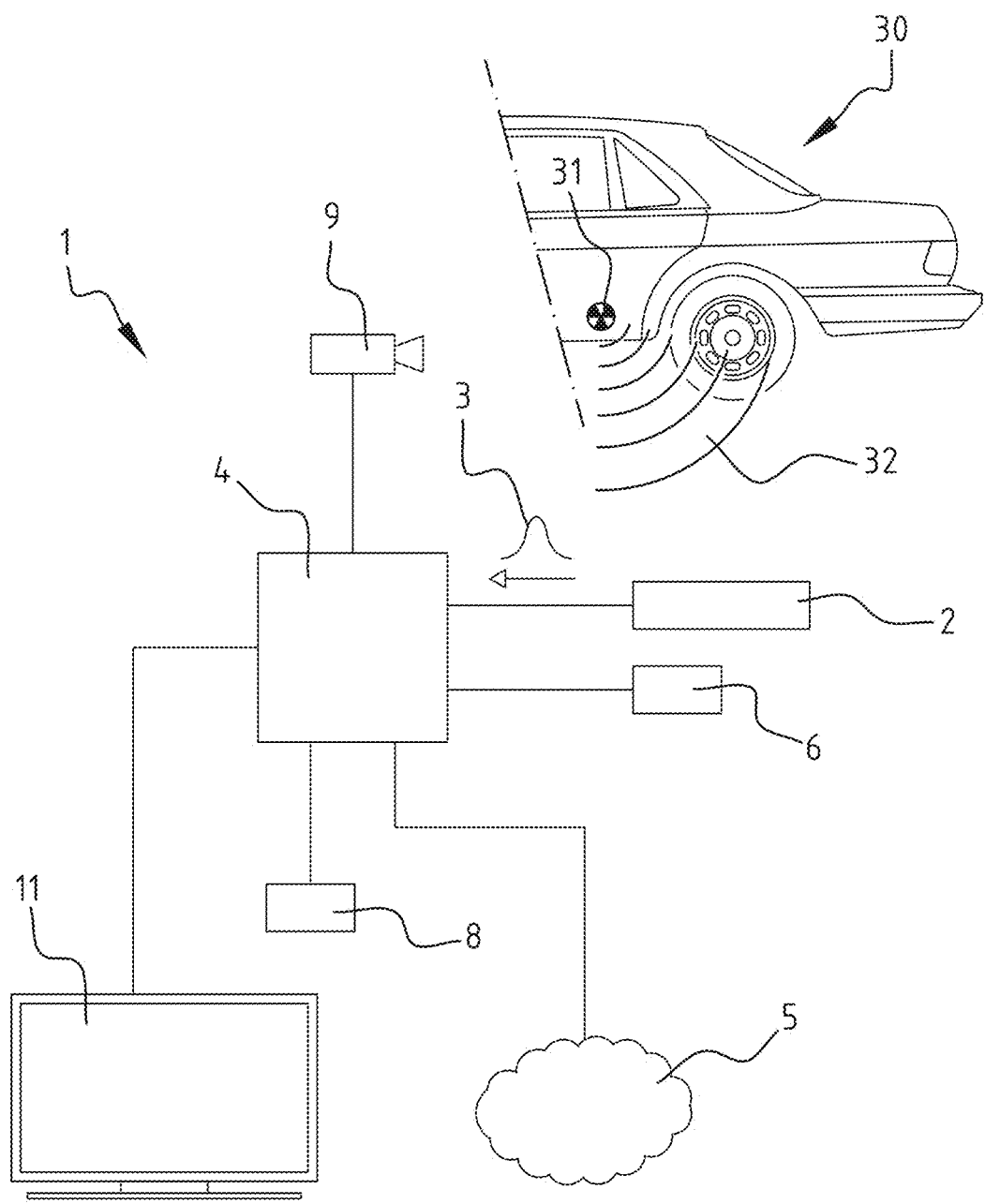

visualisation of the detection signal overlaid onto the image of the vehicle for localisation of the anomaly in or on the vehicle.

13 Claims, 5 Drawing Sheets

(51) Int. Cl.
    *H04N 5/272*     (2006.01)
    *H04N 7/18*     (2006.01)

(58) Field of Classification Search
    CPC ......... G01T 1/167; G01T 1/16; G01T 1/1603; G01T 1/169; G01T 3/00; G01T 1/00; G01T 7/00; G01T 7/02; G01T 7/08; G01T 7/12; G06V 10/255; G06V 20/52; G06V 20/50; G06V 10/25; G06V 10/7715; G06V 2201/07; G06V 2201/08; G06V 10/147; G06V 10/82; G06T 2207/30252; G06T 2207/30208; G06T 7/246; G08B 21/182; H04N 5/272
    See application file for complete search history.

(56) References Cited

U.S. PATENT DOCUMENTS

| | | | | |
|---|---|---|---|---|
| 7,388,205 | B1* | 6/2008 | Verbinski | G01V 5/26 250/358.1 |
| 8,067,719 | B2* | 11/2011 | Herrera | H04N 7/18 250/559.46 |
| 2005/0029460 | A1 | 2/2005 | Iwatschenko-Borho et al. | |
| 2006/0170768 | A1* | 8/2006 | Riley | H04N 7/181 348/143 |
| 2007/0034808 | A1 | 2/2007 | Evans | |
| 2009/0116614 | A1* | 5/2009 | Kotowski | G01V 5/20 378/57 |
| 2009/0257555 | A1* | 10/2009 | Chalmers | G01V 5/232 378/57 |
| 2010/0238290 | A1* | 9/2010 | Riley | H04N 23/50 348/148 |
| 2012/0327231 | A1 | 12/2012 | Cochran et al. | |
| 2014/0240134 | A1* | 8/2014 | Cibils | G01V 5/281 340/600 |
| 2018/0217280 | A1* | 8/2018 | Zhang | G01T 7/12 |
| 2019/0250302 | A1* | 8/2019 | Qu | G01V 5/20 |
| 2020/0100115 | A1* | 3/2020 | Skaaksrud | H04W 4/38 |
| 2020/0309972 | A1* | 10/2020 | Price | G01T 1/2964 |
| 2022/0137253 | A1* | 5/2022 | Chandrasekharan | G01T 3/00 250/394 |

FOREIGN PATENT DOCUMENTS

| | | | | |
|---|---|---|---|---|
| CN | 110414391 | A * | 11/2019 | ............ G01V 11/00 |
| EP | 2988150 | A2 * | 2/2016 | ............ G01N 23/04 |
| KR | 101581004 | B1 | 12/2015 | |

OTHER PUBLICATIONS

International Preliminary Report on Patentability dated Sep. 9, 2022, for Application No. PCT/NL2021/050194 (13 pages).

* cited by examiner

A-A

VEHICLE MONITORING SYSTEM AND METHOD OF MONITORING VEHICLES

This application is a national stage filing under 35 U.S.C. 371 of pending International Application No. PCT/NL2021/050194, filed Mar. 24, 2021, which claims priority to Netherlands Patent Application No. 2025257, filed Apr. 1, 2020, the entirety of which applications are incorporated by reference herein.

The present disclosure relates to a vehicle monitoring system and a method of monitoring vehicles.

Vehicle monitoring is generally performed for various purposes, including security, safety, sanitation, maintenance and customs. Conventionally, vehicle monitoring involves visual inspection of a vehicle in order to find any anomalies. However, visible inspection is often misleading and may be deliberately circumvented. This is particularly problematic in security applications where anomalies are as diverse as contraband, arms, explosives and illegal substances. For example, a forbidden or dangerous object may be hidden or visibly appear perfectly acceptable. Likewise, automated systems are available which are provided with a camera that allows visual registration of an image of a vehicle, but still such systems are based on a visually detectable presence of an anomaly.

US 2012/0327231 A1 discloses a method for detecting radiation from passing vehicles by receiving radiation sensor data from multiple radiation sensors that are positioned separately from each other about a path along which vehicles travel. Time-shifted sensor signals are synchronised by using video cameras to generate a strong enough signal from passing vehicles to identify a unique vehicle associated with a radiation threat.

US 2007/034808 A1 discloses a system to detect low-level nuclear devices concealed in vehicles on public roadways by statistical analysis to discern differences between background fluctuations and source-induced fluctuations in radiation detectors.

The above acknowledged prior art at most relates to ways to identify vehicles carrying a radioactive source within a stream of traffic.

It is therefore an objective of the present disclosure to provide an improved vehicle monitoring system and method of monitoring vehicles. This is achieved by providing a vehicle monitoring system according to appended independent system claim, as well as a method of monitoring vehicles according to the appended independent method claim. In particular, the system and method according to the invention allow localisation of the anomaly in or on the vehicle, in addition to identifying vehicles carrying anomalies.

As the vehicle monitoring system of the present disclosure comprises a detector configured to detect an invisible indicator of the anomaly, the anomaly may be detected even when it is not visually detectable by a person. Likewise, as the method of monitoring vehicles comprises the step of detecting an invisible indicator of the anomaly, the anomaly may be detected even when it is not visible.

In conventional monitoring systems and methods, invisible characteristics of objects are missed, although such invisible features often are relevant and even defining characteristics of anomalous objects. As a consequence, embodiments of the present disclosure provide a considerable improvement over vision based conventional systems.

In the context of the present disclosure, the term invisible indicator refers to indicators, such as radiation and fields, which are not perceived by the normal visible sense of a person. The system and method thus augment the senses of a person monitoring vehicles, such as a security guard. Furthermore, the present disclosure provides advantageous automation and increased through-put of vehicle monitoring.

In addition to a detection signal associated with the invisible indicator, an image of the vehicle is captured. By visualising the detection signal overlaid onto the image of the vehicle, localisation of the anomaly in or on the vehicle is made possible.

The detector of the vehicle monitoring system is configured to detect an invisible indicator originating from or emitted by the anomaly. This has the advantage of direct detection rather than, for example, absorbance detection.

Additionally or alternatively, the detector may be configured to detect at least one invisible indicator from a group which comprises magnetic fields, ionizing radiation, alpha particles, beta particles, gamma rays, hazardous or harmful radiation and invisible electromagnetic radiation. When the detector is configured to detect magnetic fields, an anomaly like a tracker device or a bomb, being attached to the vehicle using a magnet, can be detected with the vehicle monitoring system. Notably, the magnet may or may not be a part of the anomaly itself. For example a bomb may be merely attached to a vehicle using a magnet, whereby the magnet sticks to a metallic part of the vehicle. When the detector is configured to detect at least one of ionizing radiation, alpha particles, beta particles, gamma rays, hazardous radiation or harmful radiation, anomalies such as nuclear waste, dirty bombs and harmful substances can be detected with the vehicle monitoring system. This may effectively reduce risks posed by criminal and/or terrorist activities. To achieve the above detection, the detector may, for example, comprise a compass needle, a Hall effect sensor, a magnetometer, a Geiger counter, an ion chamber, a scintillator, a dosimeter and/or a charge-coupled device.

The detector is further configured to generate a detection signal associated with the invisible indicator while the system further comprises a controller configured to process the detection signal. With a controller configured to process the detection signal generated by the detector, the vehicle monitoring system may be further automated as manual read-out of the detector is obviated.

Preferably, the controller is further configured to determine whether the detection signal exceeds a threshold. The threshold may be static or dynamic and/or may depend on a predetermined condition. For example, the controller may further be configured to obtain vehicle information associated with the vehicle from a database and dynamically set the threshold based on the vehicle information. The threshold may thus depend on the specific vehicle being monitored by the vehicle monitoring system. This reduces incorrect detection outcomes, such as false positives and false negatives where the anomaly is detected as present when in fact it is not and vice versa. In order to determine what vehicle information to obtain, the vehicle may be identified or classified, for example via manual input by an operator and/or a vehicle identification device using, for example, license plate recognition, vehicle brand-model-colour recognition and/or vehicle contour recognition. Vehicle brand-model-colour and/or contour recognition is preferred since license plates may be fake or stolen.

Preferably, the controller is further configured to generate an alarm signal when the detection signal exceeds the threshold. The vehicle monitoring system may further comprise an alarm module configured to receive the alarm signal from the controller and output a warning. The warning may be in the form of an audible, visual or haptic signal to indicate danger. The warning may be directed at the operator or other people in proximity of the system. The alarm signal and/or the warning may be directed in a wired or wireless way to other devices or operators remote from the detector.

The controller may further be configured to log the detection signal in a memory. The memory with the logged detection signal may then be used to continuously update the database and improve sensitivity and/or specificity of the system. The memory may, for example, comprise a neural network to achieve this.

The vehicle monitoring system further comprises a camera configured to capture an image of the vehicle. The camera may capture images of the vehicle in any wavelength range of the electromagnetic spectrum, including infrared, visible and ultraviolet. It should therefore not be understood as limited to the range of the electromagnetic spectrum that is generally visible for humans. The image of the vehicle may be logged in the memory alongside the detection signal. A log may thus be generated in which the detection signal and image of the same vehicle are combined for later referral. The camera may be directed to a face of the vehicle also probed by the detector. This face may be a side, a top or an underside of the vehicle.

The controller is further configured to process the image of the vehicle captured by the camera and to visualise the detection signal overlaid onto the image of the vehicle. This allows localisation of the anomaly in or on the vehicle. In other words, the controller is further configured to, based on processing of the image and the detection signal, generate a visualisation of the detection signal overlaid onto the image of the vehicle for localisation of the anomaly in or on the vehicle. Such localisation is particularly relevant when the anomaly must be remedied or removed from the vehicle. In other circumstances, the mere detection of the anomaly may be sufficient in order to enable operators to take further measures, such as escalating security protocols, while localisation of the anomaly can aid in establishing a risk level posed by the anomaly. The overlay of the detection signal with the image of the vehicle may be obtained by time gating the detection signal and capturing of the image.

In any embodiment, the vehicle monitoring system may further comprise a display configured to show output of the system. Said output may include any one of the detection signal, the threshold, the vehicle information, the alarm signal, the warning, the image of the vehicle and combinations thereof. In particular, the display may further be configured to show the vehicle information and/or the warning and/or the image of the vehicle and/or the visualisation of the detection signal overlaid onto the image of the vehicle. When the display is configured to show at least the visualisation of the detection signal overlaid onto the image of the vehicle, the vehicle monitoring system readily allows operators to localise the anomaly in or on the vehicle using the image of the vehicle and overlaid thereon the visualisation of the detection signal.

In any embodiment of the vehicle monitoring system, the detector may comprise an array of sensors configured to detect the invisible indicator or a sweeping sensor configured to detect the invisible indicator. This improves localisation of the anomaly. The array of sensors preferably comprises a linear array of sensors. A sweeping sensor preferably comprises a linearly sweeping sensor.

Preferred embodiments of the method according to the invention are described below and in the dependent claims.

Any of the methods presented here may be implemented in a computer-readable storage medium comprising instructions which, when executed by a computer, cause the computer to carry out said method.

Figure 2:
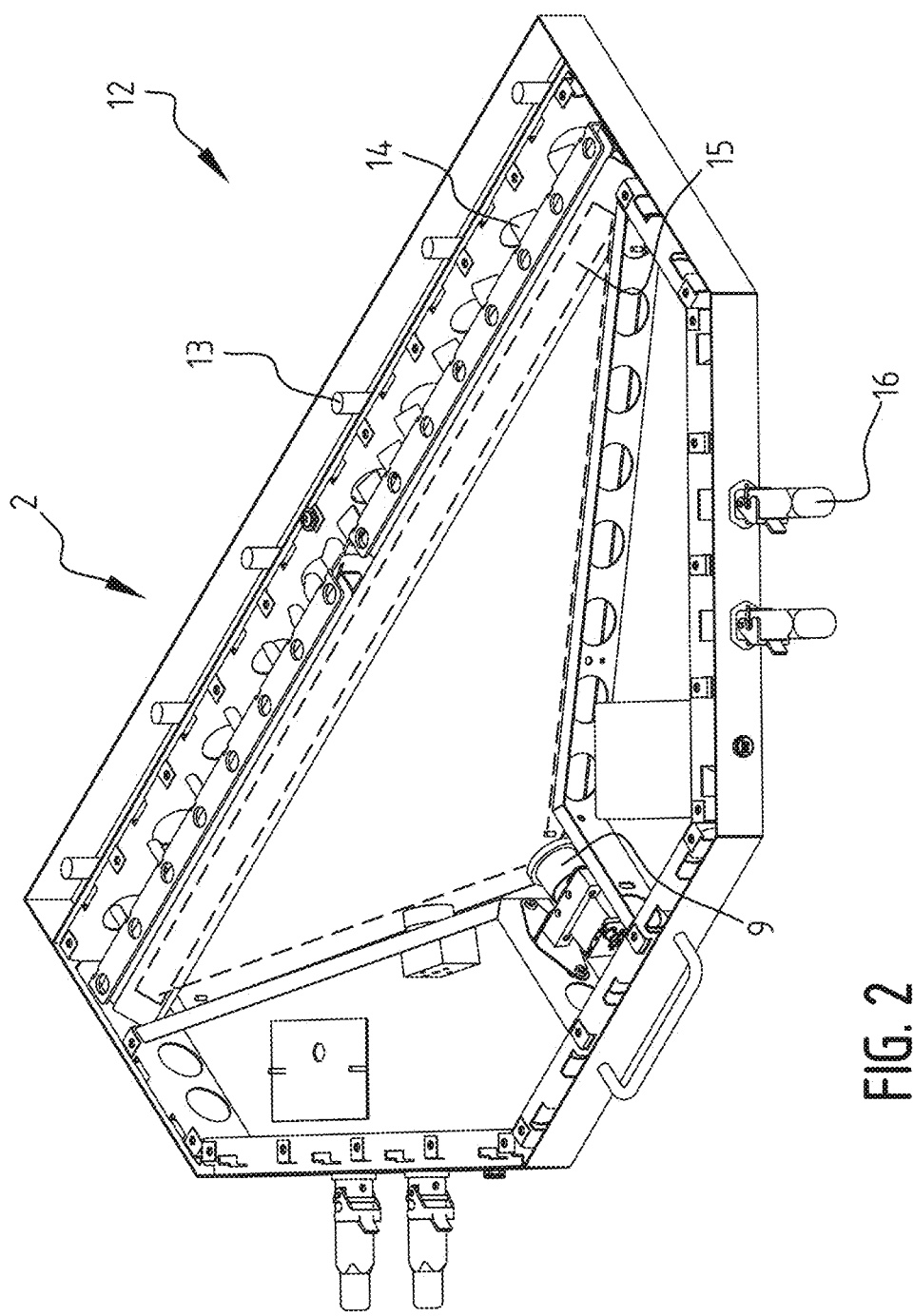
Figure 3A:
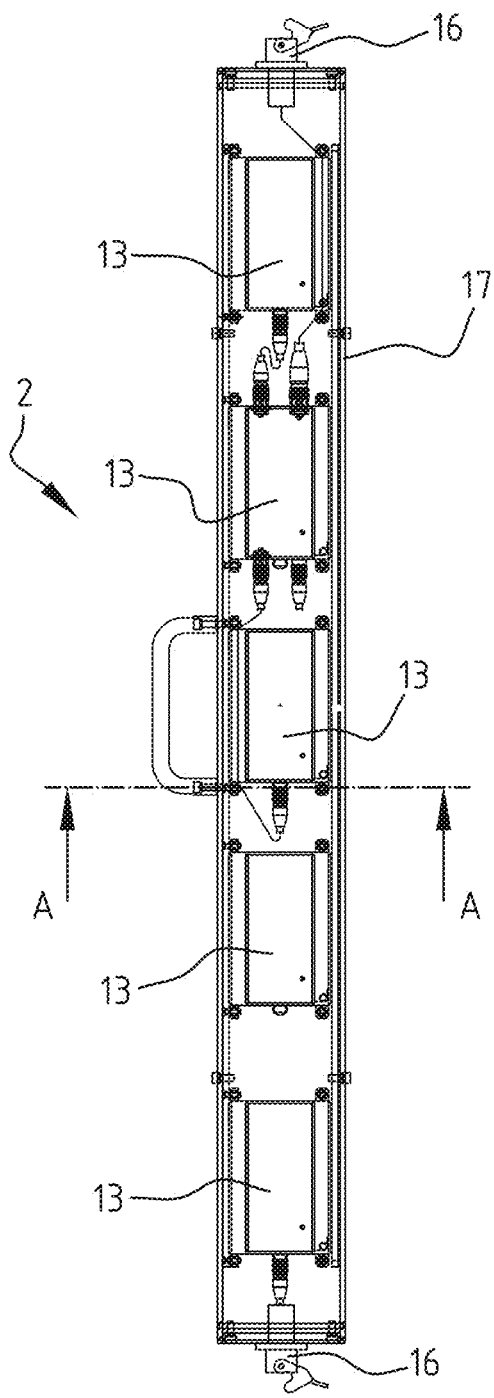
Figure 3B:
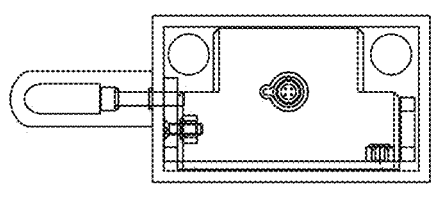
Figure 4:
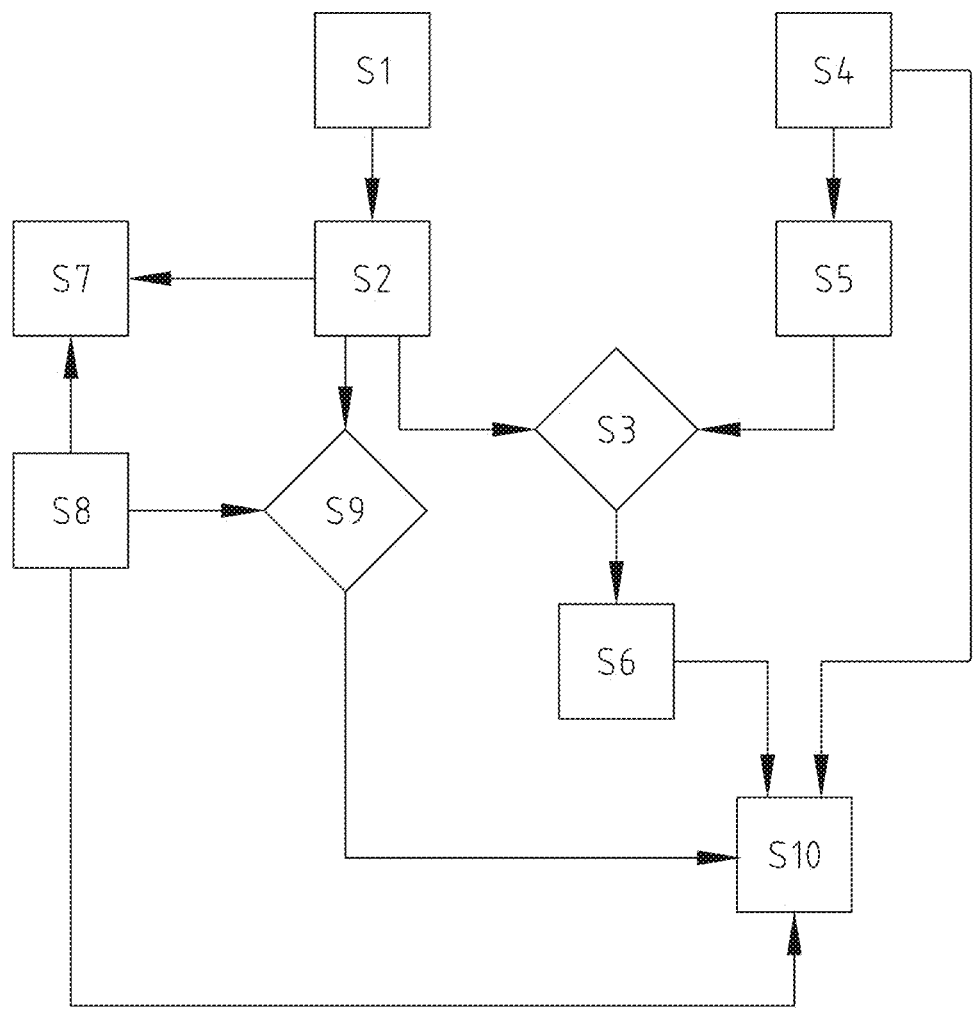
Figure 5:
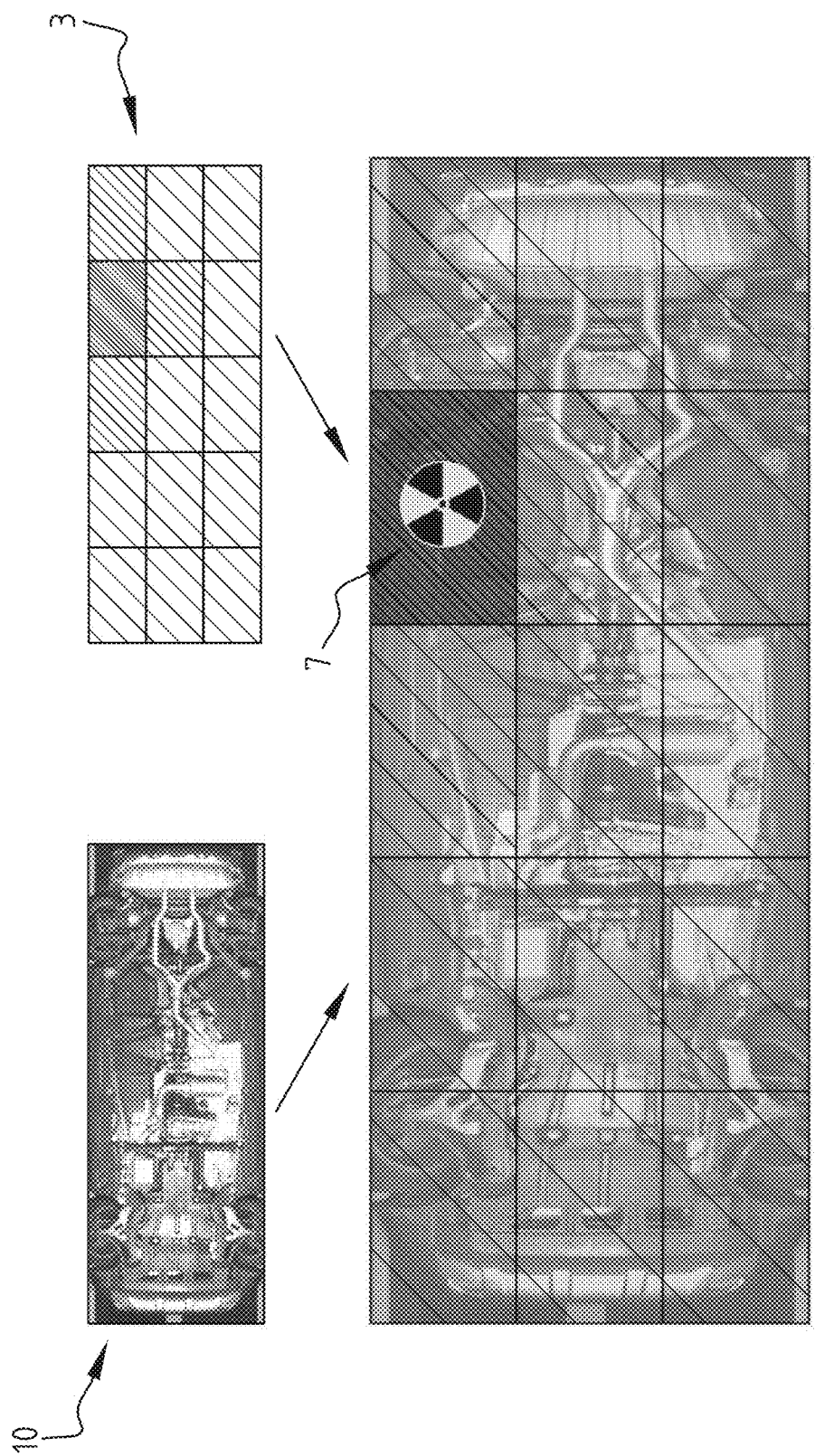

Based on the above indications of features of the present disclosure in terms of the appended claims, below an embodiment description is provided with reference to the appended drawing, where the scope of protection of the present disclosure according to the appended claims is by no means limited to any specific aspect or feature of the below discussed and in the drawing shown embodiments. Such exemplary embodiments are shown in the accompanying drawing, which shows distinct embodiments wherein the same or similar elements, components and/or aspects can be designated with the same or a similar reference numeral, and in which:

FIG. 1 schematically depicts an embodiment of the vehicle monitoring system,

FIG. 2 schematically depicts an under vehicle module of an embodiment of the vehicle monitoring system in which a detector and a camera are integrated, FIGS. 3A and 3B schematically depicts an embodiment of the detector of the vehicle monitoring system, FIG. 4 diagrammatically depicts an embodiment of the method, and FIG. 5 depicts visualising the detection signal overlaid onto the image of the vehicle.

The following reference signs are used:
1 vehicle monitoring system,
2 detector,
3 detection signal,
4 controller,
5 database,
6 alarm module,
7 warning,
8 memory,
9 camera,
10 image,
11 display,
12 under vehicle module,
13 sensor,
14 light source,
15 mirror,
16 connector,
17 housing,
30 vehicle,
31 anomaly,
32 invisible indicator,
S1 detecting invisible indicator,
S2 generating detection signal,
S3 determining whether detection signal exceeds threshold,
S4 obtaining vehicle information,
S5 setting threshold,
S6 outputting warning,
S7 logging,
S8 capturing image,
S9 visualising detection signal overlaid onto image of vehicle,
S10 showing output.

In the figures and following detailed description of the figures, the exemplary embodiment of a vehicle monitoring system as an under vehicle monitoring system is presented to illustrate the present disclosure in a coherent manner. Although this configuration of the system is advantageous, the present disclosure should not be understood to be limited to this particular configuration, and other configurations are equally possible within the scope of protection of the present disclosure, as defined in the appended claims.

FIG. 1 schematically shows a vehicle monitoring system 1 in an advantageous embodiment of the present disclosure. The vehicle monitoring system 1 is configured to detect an anomaly 31 in or on a vehicle 30 and comprises a detector 2 which is configured to detect an invisible indicator 32 of the anomaly 31. The vehicle monitoring system 1 of FIG. 1 is an advantageous example comprising additional features which are optional. Here, the detector 2 is configured to detect an invisible indicator 32 originating from or emitted by the anomaly 31 as indicated schematically by field lines. In this example, the detector 2 may in particular be configured to detect a magnetic field, ionizing radiation, alpha particles, beta particles, gamma rays, hazardous or harmful radiation and electromagnetic radiation outside of the human visible range.

As illustrated in FIG. 1, the detector 2 is also configured to generate a detection signal 3 associated with the invisible indicator 32. The detection signal 3 is supplied to a controller 4 which is configured to process the detection signal 3. In this example, the detection signal 3 is transferred via a cable, although a wireless connection is also envisaged. The controller 3 may be integrated with the detector 2, for example as illustrated in FIG. 2.

In FIG. 1, the controller 4 may further be configured to determine whether the detection signal 4 exceeds a threshold, for example to distinguish detected radiation from background noise, to obtain vehicle information associated with the vehicle 30 from a database 5 and/or to dynamically set the threshold based on the vehicle information. In the illustrated example, the database 5 is a cloud-based service which may be accessed wirelessly by the controller 4 to consult and/or download the vehicle information. Alternatively or additionally, the database 5 may be stored on a memory 8, and/or relevant entries of the database 5 may be downloaded to said memory 8 for access by the controller 4.

Vehicle information may encompass any one or more than one of the following types of information. The vehicle information may comprise an image of a vehicle, for example an under-vehicle image, of the same type of vehicle as one under review or inspection, shortly after production thereof, on the basis of which the image may be assumed to be of a safe vehicle. This allows visual detection of anomalies by comparison of an instantaneously acquired image with the downloaded image, while the downloaded image serves as a reference. When the invisible indicator 32 is a magnetic field or harmful radiation, the downloaded vehicle information may additionally or alternatively comprise a map of locations in a safe vehicle where magnets or radioactive radiation is to be expected. By comparison of the downloaded map with a detection result, unexpected magnets and/or radiation sources can be identified and possibly localised.

The controller 4 is further configured to generate an alarm signal in case of a positive detection result, for instance when the detection signal exceeds the threshold. As illustrated in FIG. 1, the vehicle monitoring system 1 further comprises an alarm module 6. The alarm module 6 is configured to receive the alarm signal from the controller 4 and to output a warning 7 in FIG. 4. The warning may be in the form of any of a sound, an image, a tactile signal, or the like.

As a further optional feature included with the vehicle monitoring system 1 of FIG. 1, the controller 4 is configured to log the detection signal 3 in the memory 8. Said vehicle monitoring system 1 also includes a camera 9 configured to capture an instantaneous image 10 of the vehicle 30. The controller 4 is further configured to process the image 10 of the vehicle 30 captured by the camera 9. Advantageously, the controller may further be configured to visualise the detection signal 3 overlaid onto the image 10 of the vehicle 30, as shown in FIG. 4. A display 11 may further be included with the vehicle monitoring system 1 in order to show an output of said system, for example as shown in FIG. 4. The display 11 is connected to the controller 4 in the illustrated example, although display 11 may alternatively be coupled to the detector 2 directly. The output of the system can additionally or alternatively include the detection signal 3, the threshold, the vehicle information, the alarm signal, the warning 7, the image 10 of the vehicle 30 and combinations of the foregoing. An example is presented in FIG. 4.

The display 11 may in particular be configured to show the vehicle information, the warning 7 and/or the instantaneously acquired image 10 of the vehicle 30. Preferably, the display 11 is configured to show the visualisation of the detection signal 3 overlaid onto the image 10 of the vehicle 30.

FIG. 2 shows an embodiment of the vehicle monitoring system 1 comprising a detector 2 as well as a camera 9. The detector 2 and the camera 9 are here integrated into an under vehicle module 12 of the vehicle monitoring system 1. The under vehicle module 12 is particularly suitable for positioning on a ground, such as a road or track, over which the vehicle 30 may pass so that the under vehicle module 12 may monitor the vehicle 30 via an underside of the vehicle 30.

The detector 2 of this embodiment comprises sensors 13, each configured to detect the invisible indicator 32 of the anomaly 31. Although the sensors 13 are illustrated in the form of an array of stationary sensors, any number of sweeping sensors 13 may be employed additionally or alternatively. In this example, the sensors 13 are configured to detect ionizing radiation, such as gamma rays, and preferably comprise scintillators and/or Geiger-Müller tubes. Alternatively or additionally, the sensors 13 may be configured to detect magnetic fields, alpha particles, beta particles, gamma rays, hazardous or harmful radiation and/or electromagnetic radiation outside of the human visible range. Various sensors 13 may thus be integrated for detection of multiple invisible indicators 32.

The camera 9 of this embodiment captures an image 10 of the underside of the vehicle 30. To that end, it is configured to collect frames in a time-gated fashion as the vehicle passes over the under vehicle module 12, although any relative movement between the vehicle 30 and the under vehicle module 12 is likewise possible. Light sources 14 are optionally provided to ensure sufficient lighting for capturing the image 10 while an angled mirror 15 is arranged to reflect light coming from the vehicle 30 into the camera 9. An angle of view of the camera 9 and a scanning frame thereof on the mirror 15 are schematically indicated in the figure with dashed lines.

In the vehicle monitoring system 1 of FIG. 2, the detector 2 is arranged at one end of the under vehicle module 12 near the mirror 15. This is advantageous for localisation of the anomaly 31 because the detection signal 3 is thus coupled to the image 10 captured by the camera 9. Other arrangements are also contemplated, including at the other end or sides of the under vehicle module 12. Alternatively, the under vehicle module 12 may comprise the camera 9 and related optical elements while the detector 2 is arranged distant from the under vehicle module 12, that is, the detector 2 is not integrated into the under vehicle module 12.

The under vehicle module 12 of FIG. 2 further comprises connectors 16 through which cables may be drawn to couple the detector 2 and camera 9 to a distal or remote controller 4, an alarm module 6, a memory 8 and/or a display 11 of the vehicle monitoring system 1. However, more of these parts of the system outside of the under vehicle module 12 may be arranged in or on the under vehicle module 12, as well. The connectors 16 are preferably dust and water tight, preferably to the IP67 standard. Alternatively, any of these components may be included with the under vehicle module 12 and/or mutually couple in a wireless way.

FIG. 3A shows an embodiment of the detector 2 in a top view and FIG. 3B shows a corresponding cross sectional view along the line A-A in FIG. 3A. In this embodiment, the detector 2 comprises five sensors 13, two connectors 16 and a housing 17. The sensors 13 are arranged in the housing 17 and may be mutually connected, for example as illustrated via wires and plugs. The sensors 13 are preferably arranged in an array in order to localise the anomaly. Here, five sensors 13 are arranged in a linear array, though different numbers of sensors 13 and/or different arrangements are possible. Each sensor 13 may comprise a scintillator, a Geiger-Müller counter or both. Preferably, the scintillator is configured for lower dose measurements and the Geiger-Müller counter is configured for higher dose measurements, for example 0.01 µSv/h-50 µSv/h and 50 µSv/h-1.0 Sv/h, respectively. This is particularly advantageous when the sensor 13 comprises both the scintillator and the Geiger-Müller counter. Each scintillator is preferably coupled to a photomultiplier. The foregoing configurations of the sensor 13 may also be applied in any other embodiment of the detector 2 of the vehicle monitoring system 1. In advantageous embodiments of the vehicle monitoring system 1, a total sensitivity of said system is not less than 6000 cps for $^{137}$Cs at 1.0 µSv/h. Alternatively or additionally, a minimum detectable activity of said system for $^{137}$Cs is $5 \cdot 10^5$ Bq at a vehicle speed of 5 km/h and an anomaly distance of 1 m, $2 \cdot 10^5$ Bq at a vehicle speed of 5 km/h and an anomaly distance of 0.5 m and $1 \cdot 10^5$ Bq at a vehicle speed of 5 km/h and an anomaly distance of 0.2 m. Further alternatively or additionally, an energy range of said system is 50 keV to 3.0 MeV. With the foregoing sensitivity, detectable activity and/or energy range, the vehicle monitoring system 1 is particularly favourably configured to detect ionizing radiation as the invisible indicator 32 of the anomaly 31 in or on the vehicle 30.

The detector 2 of FIG. 3A/3B may be configured to couple to an under vehicle module 12 of, for or in any embodiment of the vehicle monitoring system 1. The detector 2 may be configured as a retrofit for existing under vehicle modules 12 and/or vehicle inspection systems 1. The detector 2 may be thus configured as under vehicle detector 2 for placement on the ground over which the vehicle 30 is drivable as explained above in relation to FIG. 2.

The detector 2 of any embodiment of the vehicle monitoring system may be configured to detect the invisible indicator relative to at least one face of the detector 2. That is, the detector 2 may be configured for directional detection of the invisible indicator 32 of the anomaly 31. In such case, the housing 17 is preferably configured to selectively shield ionizing radiation, for example by comprising shielding material such as lead in a face of the housing 17 while another face of the housing 17 does not comprise shielding material. In the form of the under vehicle detector 2, a bottom and sides of the housing 17 may comprise the shielding material while a top is free from said shielding material. This configuration is an example in which the invisible indicator is selectively detected, that is, invisible indicators not originating from the anomaly 31 are shielded or at least mitigated.

FIG. 4 shows a flow diagram of an embodiment of the method of monitoring vehicles for detecting an anomaly 31 in or on a vehicle 30. The method comprising the essential step S1 of detecting an invisible indicator 32 of the anomaly 31. The step S1 comprises detecting an invisible indicator 32 originating from or emitted by the anomaly 31 and may comprise detecting at least one invisible indicator 32 from a group, the group comprising magnetic fields, ionizing radiation, alpha particles, beta particles, gamma rays, hazardous or harmful radiation and invisible electromagnetic radiation. Further steps are indicated in FIG. 4, although some of these are optional.

The method of FIG. 4 further comprises the step S2 of generating a detection signal 3 associated with the invisible indicator 32 and the optional step S3 of determining whether the detection signal 3 exceeds a threshold. Furthermore, the optional step S4 of obtaining vehicle information associated with the vehicle 30 and the optional step S5 of dynamically setting the threshold based on the vehicle information also provide input for step S3. In step S3, it is then determined whether the detection signal 3 exceeds the dynamically set threshold based in the vehicle information associated with the vehicle 30 currently being monitored. When it is determined in step S3 that the threshold is exceeded, the optional step S6 of outputting a warning 7 is executed.

Another optional feature is the step S7 of logging the detection signal 3.

Additionally, the method of FIG. 4 includes the step S8 of capturing an image 10 of the vehicle 30. As is illustrated, the captured image 10 is also logged. Here, the step S7 thus comprises logging both the detection signal 3 as well as the image 10 of the vehicle 30. In general, any output of the vehicle monitoring system 1 may be logged, including the detection signal 3, the threshold, the vehicle information, the alarm signal, the warning 7, the image of the vehicle 10 and combinations thereof.

Further, the method of FIG. 4 comprises the step S9 of visualising the detection signal 3 overlaid onto the image 10 of the vehicle 30. In suitable combinations of the above steps, the method may further comprise the optional step S10 of showing at least one of the vehicle information, the warning 7, the image 10 of the vehicle 30 and the visualisation of the detection signal 3 overlaid onto the image 10 of the vehicle 30. For example, the step S10 may involve showing the warning 7 as well as the visualisation of the detection signal 3 overlaid onto the image of the vehicle 30, an example of which is illustrated in FIG. 5. In other words, visualisation of the warning 7 associated with the detection signal 3 and overlay thereof onto the image 10 of the vehicle thereby actually points to a localisation in the vehicle 30, at which the anomaly 31 is located. This greatly facilitates subsequent searching for the anomaly 31, which may have to be performed under considerable time pressure, for instance when the anomaly is a bomb which could explode at any time.

FIG. 5 further illustrates embodiments of the method of the present disclosure with particular emphasis on steps S9 and S10. The detection signal 3, captured in step S2, is visualised in step S9 and overlaid on the image 10 of the vehicle 30, captured in step S8.

In FIG. 5, step 10 involves showing the detection signal 3 overlaid on the image 10 of the vehicle 30 and showing the warning 7. Here, the image 10 is an under vehicle scan as can be obtained by, for example, the under vehicle module 12 of FIG. 2. Further, the detection signal 3 is illustrated as a data grid, as can be collected by, for example, a sweeping sensor 13 or an array of sensors 13 by time-gated data collection. The warning 7 is shown on top of the visualisation of the detection signal, which in turn is laid over the image 10 of the vehicle 30. More in particular, the warning 7 is shown at a location where the detection signal 3 exceeds the threshold as determined in step S3. This allows localisation of the anomaly in or on the vehicle.

The controller 4 may be configured in various ways to generate the visualisation of the detection signal 3 overlaid onto the image 10 of the vehicle 30. For example, by time gating or synchronising of the detection signal 3 with capturing of the image 10 of the vehicle 30 by the camera 9, wherein the image 10 is preferably collected in the form of a scan of a face of the vehicle 30. These forms of processing may depend on relative placement of the detector 2 and the camera 9, which are preferably arranged to receive the detection signal 3 and the image 10 from the same face of the vehicle 30 and/or are preferably arranged nearby to improve synchronisation between the detection signal 3 and the image 10, for example as illustrated in and explained in relation to FIG. 2.

Although the illustrated embodiments present the vehicle monitoring system 12 as a system for under vehicle monitoring, any detection orientation relative to the vehicle 30 may be chosen, including adjustable or movable orientations. Other configurations of the vehicle monitoring system include above vehicle monitoring, archway constructions and movable or even portable probes. Furthermore, elements of the vehicle monitoring system 1 may be mutually coupled by cabling and/or by wireless connectivity. It is thus understood that the scope of protection of the present disclosure is defined in the following claims.

The invention claimed is:

1. A vehicle monitoring system configured to detect and localize an anomaly in or on a vehicle, the anomaly emitting an invisible indicator in the form of a magnetic field or radiation, the system comprising:
    an under vehicle module for positioning on a ground over which the vehicle may pass to monitor the vehicle from below, the under vehicle module housing a detector and a camera that are arranged to monitor an underside face of the vehicle;
    wherein the detector is configured to detect the invisible indicator originating from or emitted by the anomaly and generate a detection signal associated with the invisible indicator;
    wherein the camera is configured to capture an image of the underside face of the vehicle viewed from below the vehicle in the form of a scan that is time-gated or synchronized with the detection signal as the vehicle passes over the under vehicle module; and
    a controller configured to process the detection signal generated by the detector and the image of the vehicle captured by the camera, and to, based on processing of the image and the detection signal as a data grid, determine whether the detection signal exceeds a threshold and generate a visualization of the detection signal overlaid onto the image of the vehicle indicating a location in the data grid where the detection signal exceeds the threshold to allow localization of the anomaly in or on the vehicle.

2. The vehicle monitoring system of claim 1, wherein the detector is configured to detect at least one invisible indicator from a group consisting of magnetic fields, ionizing radiation, alpha particles, beta particles, gamma rays, hazardous or harmful radiation, and invisible electromagnetic radiation.

3. The vehicle monitoring system of claim 1, wherein the under vehicle module comprises an angled mirror arranged to reflect light coming from the underside face of the vehicle into the camera.

4. The vehicle monitoring system of claim 1, wherein the controller is further configured to obtain vehicle information associated with the vehicle from a database and dynamically set the threshold based on the vehicle information.

5. The vehicle monitoring system of claim 1, wherein the controller is further configured to generate an alarm signal when the detection signal exceeds the threshold, the system further comprising an alarm module configured to receive the alarm signal from the controller and output a warning.

6. The vehicle monitoring system of claim 1, further comprising a display configured to show output of the system and/or at least one of:
    the vehicle information;
    the warning;
    the image of the vehicle; and
    the visualization of the detection signal overlaid onto the image of the vehicle.

7. The vehicle monitoring system of claim 1, wherein the detector comprises an array of sensors configured to detect the invisible indicator.

8. The vehicle monitoring system of claim 1, wherein the detector comprises a sweeping sensor configured to detect the invisible indicator.

9. A method of monitoring vehicles for detecting and localizing an anomaly in or on a vehicle, the anomaly emitting an invisible indicator in the form of a magnetic field or radiation, the method comprising:
    detecting the invisible indicator originating from or emitted by the anomaly as the vehicle passes over an under vehicle module using a detector housed in the under vehicle module;
    generating a detection signal associated with the invisible indicator;
    capturing an image of an underside face of the vehicle as viewed from below the vehicle in the form of a scan that is time-gated or synchronized with the detection signal as the vehicle passes over the under vehicle module using a camera housed in the under vehicle module;
    processing the image and the detection signal as a data grid;
    determining whether the detection signal exceeds a threshold; and
    generating a visualization of the detection signal overlaid onto the image of the vehicle, based on processing of the image and the detection signal, indicating a location in the data grid where the detection signal exceeds the threshold to
    allow localization of the anomaly in or on the vehicle,
    wherein the detecting of the invisible indicator and the capturing of the image are performed by monitoring the vehicle via an underside face of the vehicle with the detector and the camera being housed in the under vehicle module positioned below the vehicle.

10. The method of claim 9, further comprising outputting a warning when the detection signal exceeds the threshold at the location in the visualization where the detection signal exceeds the threshold.

11. The method of claim 9, further comprising logging the detection signal.

12. The method of claim 9, further comprising showing at least one of: vehicle information, a warning, the image of the vehicle, and the visualization of the detection signal overlaid onto the image of the vehicle.

13. A non-transitory computer-readable storage medium comprising instructions which, when executed by computer, causes the computer to carry out the method of claim 9.

* * * * *